United States Patent
Hu et al.

(10) Patent No.: US 10,832,387 B2
(45) Date of Patent: Nov. 10, 2020

(54) REAL-TIME INTELLIGENT IMAGE MANIPULATION SYSTEM

(71) Applicant: Petuum Inc., Pittsburgh, PA (US)

(72) Inventors: Zhiting Hu, Pittsburgh, PA (US); Eric Xing, Pittsburgh, PA (US); Chenyu Wang, Pittsburgh, PA (US)

(73) Assignee: PETUUM INC., Pittsburgh, PA (US)

( * ) Notice: Subject to any disclaimer, the term of this patent is extended or adjusted under 35 U.S.C. 154(b) by 161 days.

(21) Appl. No.: 15/946,492

(22) Filed: Apr. 5, 2018

(65) Prior Publication Data
US 2019/0026870 A1    Jan. 24, 2019

Related U.S. Application Data

(60) Provisional application No. 62/534,620, filed on Jul. 19, 2017.

(51) Int. Cl.
| | |
|---|---|
| *G06K 9/62* | (2006.01) |
| *G06T 5/00* | (2006.01) |
| *G06T 5/50* | (2006.01) |
| *G06T 11/00* | (2006.01) |

(52) U.S. Cl.
CPC .............. *G06T 5/005* (2013.01); *G06T 5/50* (2013.01); *G06T 11/00* (2013.01); *G06T 2207/20084* (2013.01); *G06T 2207/20092* (2013.01)

(58) Field of Classification Search
CPC . G06T 5/005; G06T 11/00; G06T 5/50; G06T 2207/20084; G06T 2207/20092
See application file for complete search history.

(56) References Cited

U.S. PATENT DOCUMENTS

| | | | |
|---|---|---|---|
| 2016/0364625 A1* | 12/2016 | Lin | G06T 7/60 |
| 2017/0294000 A1* | 10/2017 | Shen | G06T 11/001 |
| 2018/0068463 A1* | 3/2018 | Risser | G06T 11/001 |
| 2018/0082715 A1* | 3/2018 | Rymkowski | G06T 11/60 |
| 2018/0144465 A1* | 5/2018 | Hsieh | G06N 3/08 |
| 2018/0144466 A1* | 5/2018 | Hsieh | G06T 7/0012 |
| 2018/0158224 A1* | 6/2018 | Bethge | G06T 11/60 |
| 2018/0225812 A1* | 8/2018 | DiVerdi | G06K 9/4628 |
| 2018/0240257 A1* | 8/2018 | Li | G06T 11/001 |
| 2018/0293439 A1* | 10/2018 | Slesarev | G06K 9/00637 |
| 2018/0357514 A1* | 12/2018 | Zisimopoulos | G06N 3/0472 |
| 2018/0357800 A1* | 12/2018 | Oxholm | G06N 3/084 |

OTHER PUBLICATIONS

Leon A. Gatys, et al. "Image Style Transfer Using Convolutional Neural Networks"; The IEEE Conference on Computer Vision and Pattern Recognition (CVPR), 2016, pp. 2414-2423.*

* cited by examiner

*Primary Examiner* — Samir A Ahmed

(57) ABSTRACT

A system for manipulating images according to styles chosen by a user includes a feed-forward image manipulation model for everyday use and an optimization image manipulation model for more professional use. The optimization image manipulation model optimizes directly over output image pixels to minimize both the content loss and style loss. Users can select their own content and style images, and can choose between using the feed-forward image manipulation model and optimization image manipulation model.

20 Claims, 8 Drawing Sheets

REAL-TIME INTELLIGENT IMAGE MANIPULATION SYSTEM

FIELD OF THE INVENTION

The present invention generally relates to image processing. More specifically, it relates to a system for real-time intelligent manipulation of images into corresponding output images given user-specified guiding styles.

BACKGROUND

Image manipulation, which aims to manipulate an input image based on personalized guiding style image (e.g. art paintings), has recently attracted ever-growing research interest and derived various real-world applications, such as attribute-driven image editing and artistic style transfer.

Image manipulation systems have been deployed on a variety of devices ranging from mobile phones to dedicated servers. Some existing image manipulation systems require the use of preset styles, or distinct models for every user input image, resulting in limited or inefficient application. Even in systems which do not require the use of distinct models for every user input, the inference process for user inputs can be inefficient, particularly when the system is running on a less powerful device, such as a basic mobile phone. Moreover, the function of some existing image manipulation systems is not suitable for both casual everyday users (e.g., users modifying images on a mobile phone for entertainment) and professional users (e.g., graphic designers modifying high resolution images).

In view of the above, a need exists to provide an intelligent image manipulation system that meets the above-mentioned needs.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

In one embodiment, a feed-forward image manipulation model (i.e., "quick processing model") is utilized to transform images quickly for everyday use. In another embodiment, an optimization image manipulation model (i.e., "professional processing model") is utilized for more professional use, which optimizes directly over the output image pixels to minimize both the content loss and style loss. In another embodiment, the user can choose between using the quick processing model and professional processing model via an interface.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
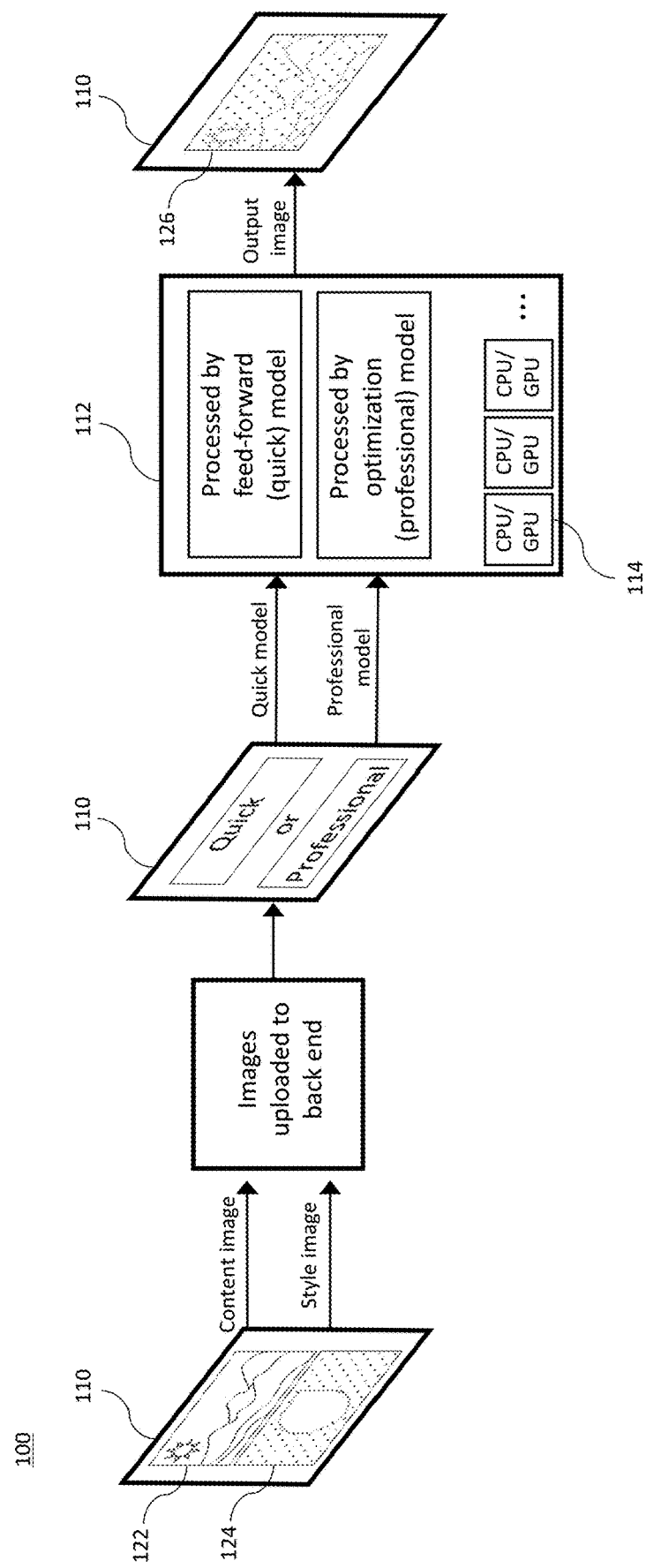
FIG. 1 is a flow chart diagram showing an exemplary end-to-end process of responding to a user requesting image manipulation, and a front-end response to the user, according to embodiments of the invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but are to be accorded the scope consistent with the claims.

The word "exemplary" is used herein to mean "serving as an example or illustration." Any aspect or design described herein as "exemplary" should not necessarily be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented except as expressly indicated by the claim language.

Embodiments disclosed herein are directed to systems for real-time intelligent manipulation of images into corresponding output images given user-specified guiding styles. In one embodiment, a feed-forward image manipulation model (i.e., "quick processing model") is utilized to transform images quickly for everyday use. In another embodiment, an optimization image manipulation model (i.e., "professional processing model") is utilized for more professional use, which optimizes directly over the output image pixels to minimize both the content loss and style loss. Embodiments are disclosed in which a user can choose between using the quick processing model and professional processing model via an interface. Embodiments are also disclosed in which a graphical user interface (GUI) for a display screen or portion thereof allows a user to choose a desired style, upload one or more content images, and choose one or more content images to manipulate.

FIG. 1 is a flow chart diagram 100 showing an exemplary end-to-end process of responding to a user request, including a front-end interface 110 to receive the request, triggering of appropriate back-end models (i.e., quick processing model or professional processing model), image manipulation with respective model on a back-end server 112 with distributed computing support, and a front-end response to the user, wherein an output image 126 is displayed on the interface, according to embodiments of the invention. Interface 110 can comprise a display, and an input device, e.g., a touch screen input device. For ease of explanation, interface 110 is labeled as 110a, 110b, and 110c at different steps of the process 100 in FIG. 1.

At interface 110a, a user is prompted to select a content image 122 and a style image 124. Content image 122 reflects the user's desired content for the stylized output image 126, for example, the desired objects, shapes, and composition of the output image. As discussed in more detail with reference to FIG. 4B below, in some embodiments, the user may upload multiple content images, and apply the image manipulation to each content image simultaneously. Style image 124 reflects the user's desired style (also referred to herein as a style guide) for the stylized output image 126, for example, the desired colors, textures, and patterns of the stylized output image. As discussed in more detail with reference to FIG. 4A below, the style guide may be selected from among several preset styles, or may be generated based on a style image uploaded by the user.

Once content image 122 and style image 124 are chosen by the user, the images are uploaded to a back-end server, such as server 112. The user is then prompted by interface 110b to select either the quick processing model or the professional processing model. The back-end server 112 then performs image manipulation based on the user's choice of processing model, which is described in more detail with reference to FIGS. 2, 3, and 6 below, for example, using additional distributed computing support from multiple CPUs and/or GPUs 114. Finally, the one or more stylized output images 126 are displayed to the user at interface 110c, where the user may choose to save the output images or adjust image manipulation parameters.

Significantly, the process 100 shown in FIG. 1 is "zero-shot," meaning that the configurations for both the quick processing model and professional processing model are established automatically based on guiding signals, and thus the system does not require individual training or models to process the user's custom content image and/or style image. Because of this, computation complexity and memory usage can be greatly reduced compared to existing style transfer models which are not zero-shot.

The system and process described with reference to process 100 in FIG. 1 is advantageous as it accommodates both wide scale ordinary uses, and advanced professional uses. For example, ordinary users generally need immediate response on manipulating modest-resolution photos (e.g., taken with mobile phones), while professional users (e.g., graphic designers), require quality results from high-resolution input images, but with orders-of-magnitude shorter processing time compared to manual design and drawing. To this end, the two different image manipulation models (i.e., quick processing model and professional processing model) are offered to the user in order to achieve the differing needs.

Both the quick processing model and the professional processing model are based on powerful deep neural networks that allow efficient end-to-end training and enjoy high generalization capacity to unseen styles. For the first task of everyday use, the model is a feed-forward neural network that generates results by taking a simple forward pass through the network structure. For the second task of professional use, the other model performs fine-grained optimization on the output image and produces a result that fuses the content and style in a detailed and coherent manner. Each of these models are described below.

Figure 2:
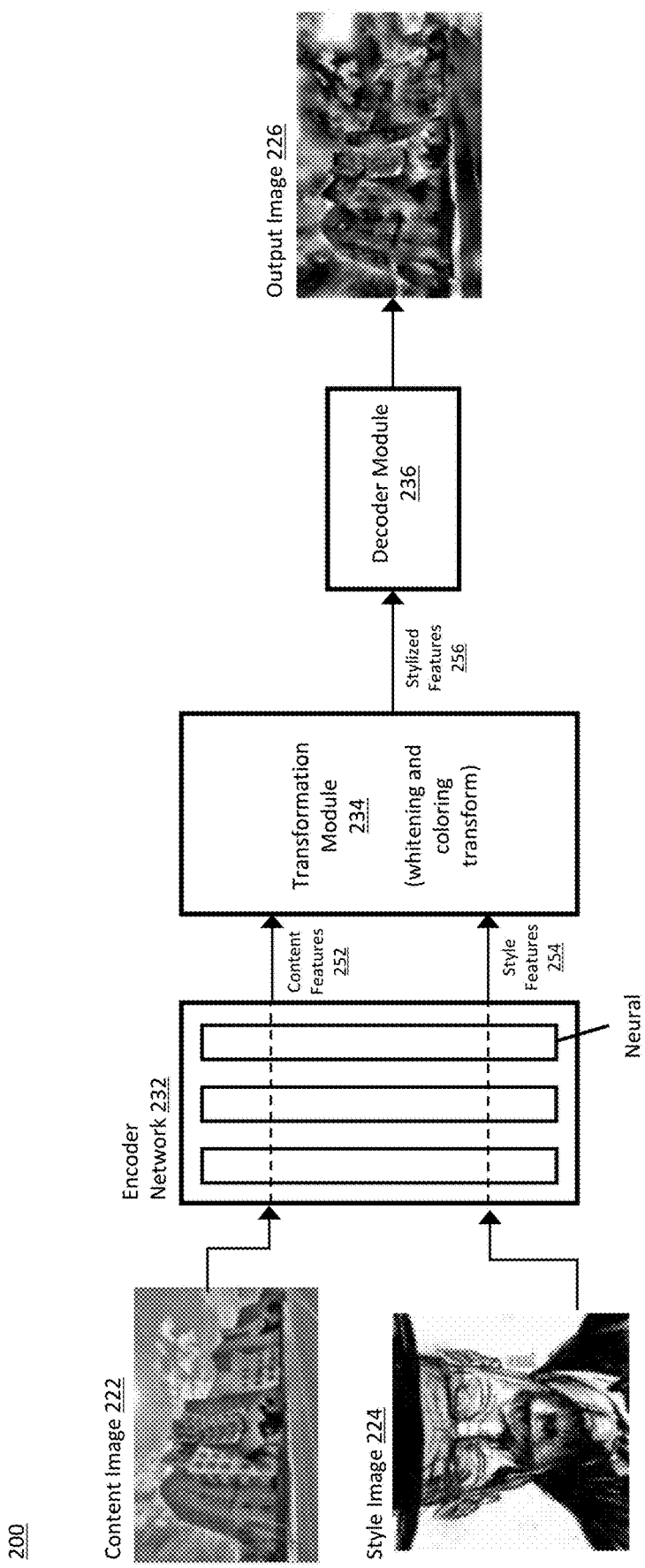
FIG. 2 illustrates a flow chart diagram of an exemplary feed-forward "quick processing" image manipulation model that performs a feed-forward pass starting from the content image and style image, and outputs the stylized output image according to embodiments of the invention.

FIG. 2 relates to an embodiment of the present disclosure, wherein a feed-forward image manipulation model is utilized to transform images quickly for everyday use. FIG. 2 illustrates a flow chart diagram 200 of an exemplary feed-forward processing model (i.e., "quick processing model") that performs a feed-forward pass starting from a content image 222 and style image 224, and outputs a stylized output image 226, according to embodiments of the invention. An example content image 222 and style image 224 are shown in FIG. 2. In this example, the content image 222 is a photograph of a building, and the style image 226 is a portrait drawn in charcoal-style with heavy shadows. Both the content image 222 and style image 226 are initially represented as pixels. It should be understood that content image 222 and style 226 are shown here as examples only, and that the process depicted in diagram 200 may process a variety of content and style images As shown, content image 222 and style image 226 can be received by an encoder network 232. Encoder network 232 can comprise a deep convolutional neural network of multiple neural layers 231. Encoder network 232 can extract the feature vectors from both the content image and the style image by applying a series of non-linear transformations. As a result, encoder network 232 generates a content feature vector (i.e., "content features" 252) from content image 222, and a style feature vector (i.e., "style features" 252) from style image 226. In other embodiments not shown, style feature vector 254 is not generated from a style image, but is retrieved from memory storage as a preset style. Content feature vector 252 and style feature vector 254 are each low-dimensional real-value vectors, which represent high-level abstract characteristics of their respective images.

Next, the content feature vector 252 and style feature vector 254 are received by a transformation module 234. Transformation module 234 may comprise another deep convolutional neural network, similar to that described with reference to the encoder network 232. In other configurations, transformation module 234 is incorporated into the same deep convolutional network as encoder network 232. To eliminate the original style encoded in the content feature vector 252 (e.g., the colors and textures of content image 222), a whitening transformation (a linear algebra operation well known in the art) is applied on the content feature vector by the transformation module 234. After applying the whitening transformation, the covariance matrix of the resulting whitening-transformed vector is an identity matrix. The style encoded in the style feature vector 254 is then added to the whitening-transformed content feature vector using a coloring transformation (another linear algebra operation well known in the art). The resulting vector is the stylized feature vector (i.e., "stylized features" 256), which has the same covariance matrix as the style feature vector 254. The stylized feature vector 256 represents the content of content image 222 and the style of style image 224. In some embodiments, the whitening and coloring transformation described above is performed multiple times (e.g., at different layers of the transformation module) in order to capture image elements at different granularities.

Finally, the stylized feature vector 256 is decoded by a decoder module 236 to create the output image 226. For example, the gradient of stylized feature vector 256 may be calculated by decoder module 236 to generate the pixels of output image 226. In one embodiment, the stylized feature vector 256 is fed into the decoder module 236 to generate the pixels of output image 226 after a series of non-linear transformations.

Figure 3:
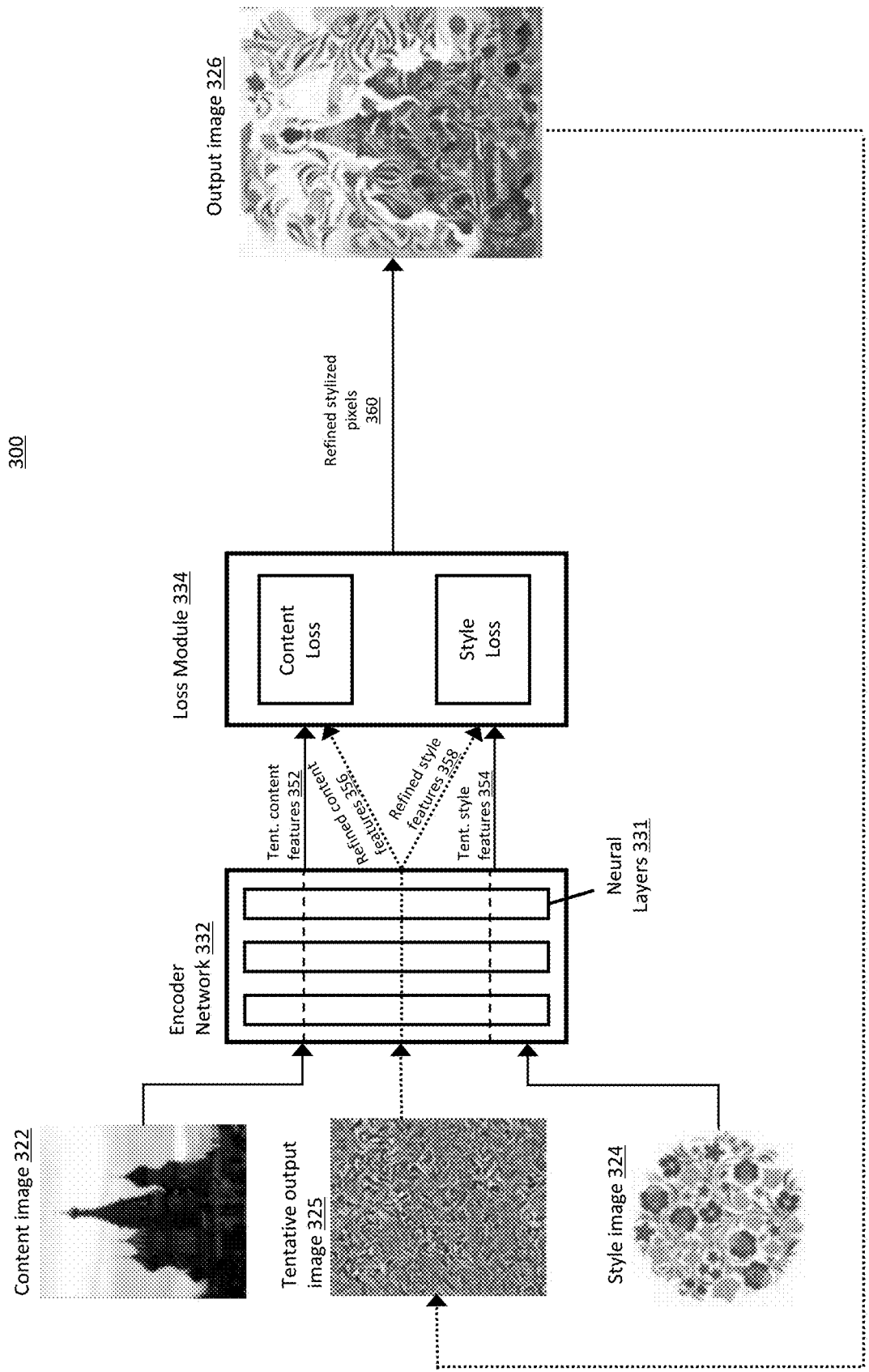
FIG. 3 illustrates a flow chart diagram of an exemplary optimization-based "professional processing" image manipulation model that optimizes directly over the output image pixels to minimize both the content loss and style loss according to embodiments of the invention.

FIG. 3 relates to an embodiment of the present disclosure, wherein an optimization-based manipulation model is utilized to minimize content loss and style loss, which is suitable for professional applications. FIG. 3 illustrates a flow chart diagram 300 of an exemplary optimization-based processing model (i.e., "professional processing model") that optimizes directly over output image pixels according to embodiments of the invention. Unlike the quick processing model described with reference to FIG. 2, which performs a feed-forward pass of the network to produce the stylized image, the professional processing model depicted in diagram 300 performs iterative optimization directly on the pixel values of an output image. To aid in explanation, optimization steps are depicted as dotted lines in FIG. 3.

An example content image 322 and style image 324 are shown in FIG. 3. In this example, the content image 322 is a photograph of a building, and the style image 324 is a floral pattern. As in the quick processing model described with reference to FIG. 2 above, content image 322 and style image 324 are received by an encoder network 332, which can be similar to the encoder network 232 described with reference to FIG. 2.

Encoder network 332 first generates a tentative content feature vector (i.e., "tent. content features" 352) from the content image 322, and a tentative style feature vector (i.e., "tent. style features" 354) from the style image 324. The form of these vectors and the process by which they are generated can be substantially similar to that described with reference to the content feature vector 252 and style feature vector 254, respectively, in FIG. 2.

Next, a loss module 334 receives the tentative content feature vector 352 and tentative style feature vector 354 from the encoder network 332. The loss module 334 is configured to compute a content loss with regard to the tentative content feature vector 352 and a style loss with respect to the tentative style feature vector 354. As a result, the refined stylized pixels 360 are generated to produce the output image 326.

The output image 326 is obtained by computing the gradient of the content loss and style loss with regard to the image pixels, and applying the gradient to the pixels of the tentative output image 325 to get new pixel values. The resulting output image 326 then serves as a tentative output image 325 in the next pass. As used herein, a tentative output image is an output image which has undergone at least a first-pass transformation, but which is not fully optimized by the professional processing model. For example, here the tentative output image 325 may include some elements of the content image 322 and style image 324, but these elements are not easily discerned as the image is not fully optimized.

Next, the tentative output image 325 is received by the encoder network 332, which encodes the tentative output image 325 into two vectors: a refined content feature vector (i.e., "refined content features" 356), and a refined style feature vector (i.e., "refined style features" 358). As used herein, the refined content feature vector 356 and refined style feature vector 358 are vectors which are generated from a tentative output image, which has undergone at least the first-pass transformation discussed above.

Next, the loss module 334 receives the refined content feature vector 356 and refined style feature vector 358 and determines various loss factors for the models to optimize. For example, the loss module 334 may compare the tentative content feature vector 352 (based on the content image 322) to the refined content feature vector 356 (based on the tentative output image 325) to determine a content loss factor. Likewise, the loss module 334 may compare the tentative style feature vector 354 (based on the style image 324) to the refined style feature vector 358 (based on the tentative output image 325) to determine a style loss factor. The loss module 334 then optimizes the refined content feature vector 356 and refined style feature vector 358, and thereby generates the refined stylized pixels 360.

If the optimization process is complete, the refined stylized pixels 360 is used to construct the final output image 326. However, if the optimization process is not complete, the refined stylized pixels 360 is used to produce a new tentative output image 325, and the optimization process repeats. Repeating the optimization process on the new tentative output image 325 yields a further optimized refined content feature vector 356, further optimized refined style feature vector 358, new content and style loss factors, and further optimized refined stylized pixels 360, which, in turn, is decoded into yet another tentative output image. This process repeats until the optimization process is complete, which can be determined by a preset parameter stored in memory (e.g., a pre-defined number of iterations), or by a user input (e.g., the user stopping the process at a desired level of optimization). In some examples, if a user stops the process at a desired level of optimization, this desired level can be recorded and used to fine-tune the preset optimization parameters stored in memory.

The objective of the professional processing model described in diagram 300 is to minimize the Euclidean distance between the neural features of the content image 322 and the output image 326, and minimize the Euclidean distance between the covariance matrixes of the neural features of the style image 324 and the output image 326. The first objective helps the output image 326 to better retain the semantic details of the content image 322, while the second drives the output image to capture the colors and textures of the style image 324. Thus, the direct optimization on output pixels described in this embodiment give a more intuitive way of content and style combination, and can generate high-quality realistic images with a natural fusion of content and style details.

It should be understood that the quick processing model described with reference to FIG. 2 and the professional processing model described with reference to FIG. 3 can each be used alone, in combination, or together in a system that gives the user a choice of either model, as described with reference to the example process 100 in FIG. 1. Additionally, though not illustrated in FIGS. 2-3, some or all of the elements of the processes described may be distributed to one or more external devices, such as central processing units (CPUs) or graphic processing units (GPUs). In these examples, a distribution module in communication with the various modules and networks can distribute data and instructions to the external devices for efficient training and real-time responses.

Figure 4A:
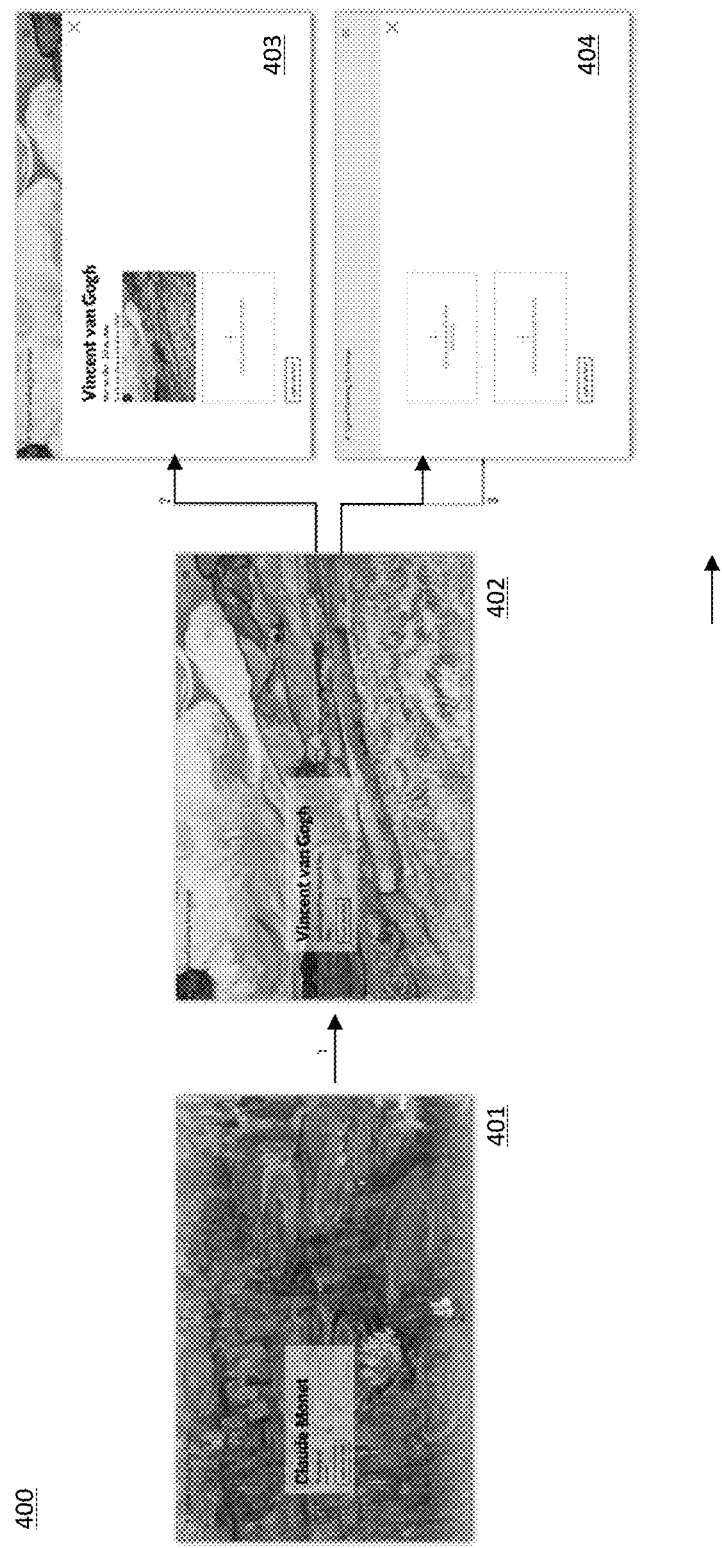
FIG. 4A illustrates front views of a graphical user interface (GUI) for a display screen or portion thereof wherein a user may select a style, including a personalized guiding style image, according to embodiments of the invention.

FIG. 4A illustrates front views 400 of a graphical user interface (GUI) for a display screen or portion thereof showing how a user may select a style, including a personalized guiding style image (e.g., style images 224 and 324 discussed above), according to embodiments of the invention. The GUI depicted in FIGS. 4A-4B may correspond, for example, to a GUI on interface 110 discussed with reference to FIG. 1 above. As shown in screens 401-404, a user can choose a desired style image, representative of the style (e.g., color, texture, and patterns) desired in the output image. Screens 401 and 402 of FIG. 4A illustrate example preset artistic styles that might be presented to the user, for example, an impressionist style characteristic of Claude Monet or a post-impressionist style characteristic of Vincent van Gogh. The user can then select one of these artistic styles, as shown in screen 403. In the case where the user selects a preset artistic style, the system may load the style feature vector (or tentative style feature vector) from memory, rather than generating the style feature vector from the style image itself. In addition, a preset artistic style may have one or more associated preset parameters (e.g., training parameters). As shown in FIG. 404, if users do not select a preset artistic style, they may upload their own guiding style image, from which the style feature vector can be generated.

Figure 4B:
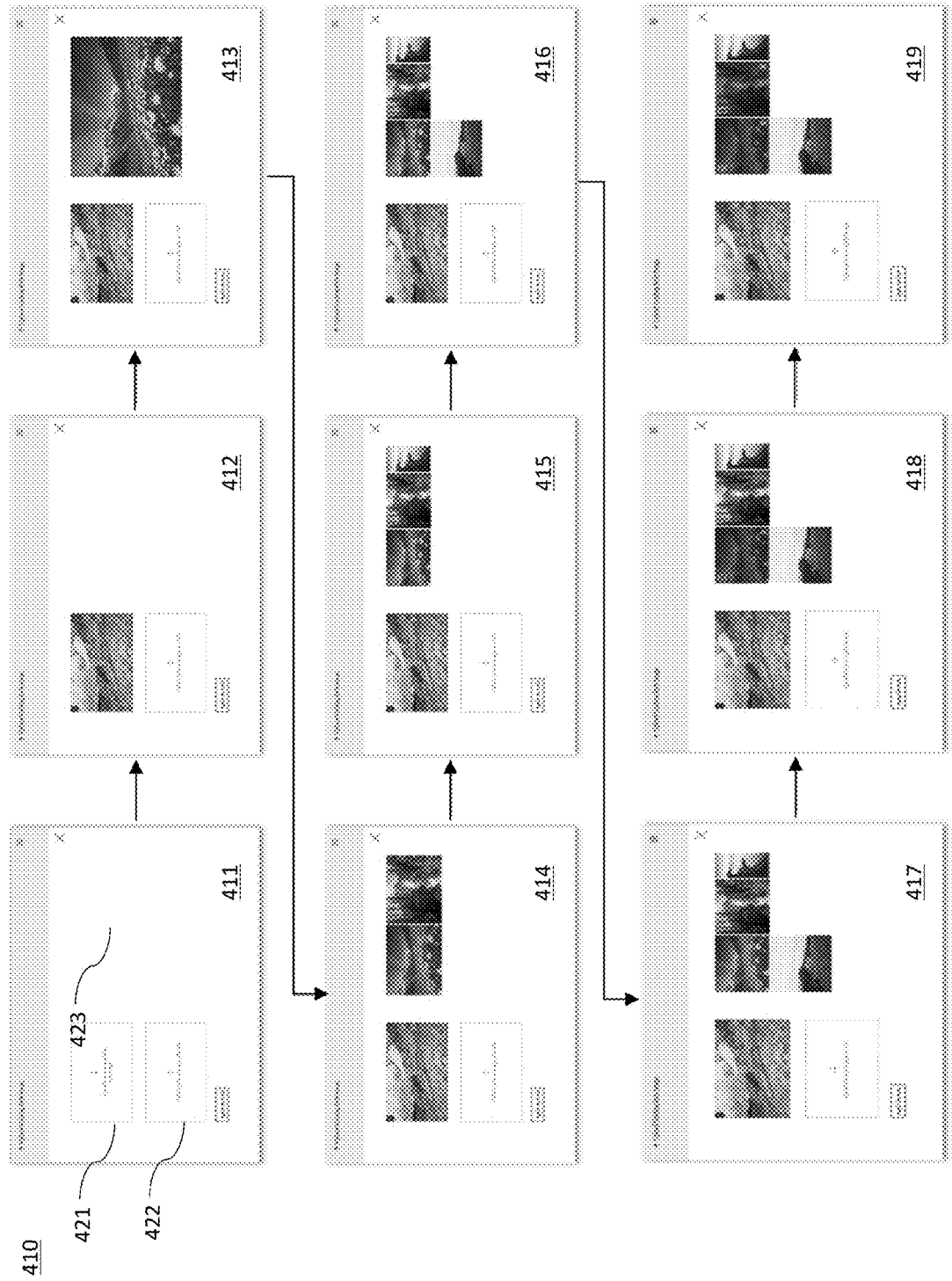
FIG. 4B illustrates front views of a GUI for a display screen or portion thereof wherein a user may upload one or more content images and the images are arranged to form a grid, and wherein one or more of the images can be selected for transformation, according to embodiments of the invention.

FIG. 4B illustrates front views 410 of a GUI for a display screen or portion thereof wherein a user may upload one or more content images (e.g., content image 222 and 322 discussed above) and the images are arranged to form a grid, and wherein one or more of the images can be selected for transformation, according to embodiments of the invention. As shown in screen 411, a user can activate a first button 421 to upload a content image, and can activate a second button 422 to upload a style image or select a preset artistic style. A display region 423 at the right of the screen can display the uploaded content images. Screen 412 depicts the uploading of a first content image, which is added to the display region 423 in screen 413. Screens 414-416 depict the user uploading three additional content images. As shown, as the number of uploaded content images increases, the display area automatically arranges the size and position of the content images to form a grid for easy review by the user. Screens 417-419 depict the user selecting multiple content images in the display area 423 for transformation. In this way, the user can select one or more content images from all of the uploaded content images, and apply the transformation to the selected images simultaneously.

Figure 5:
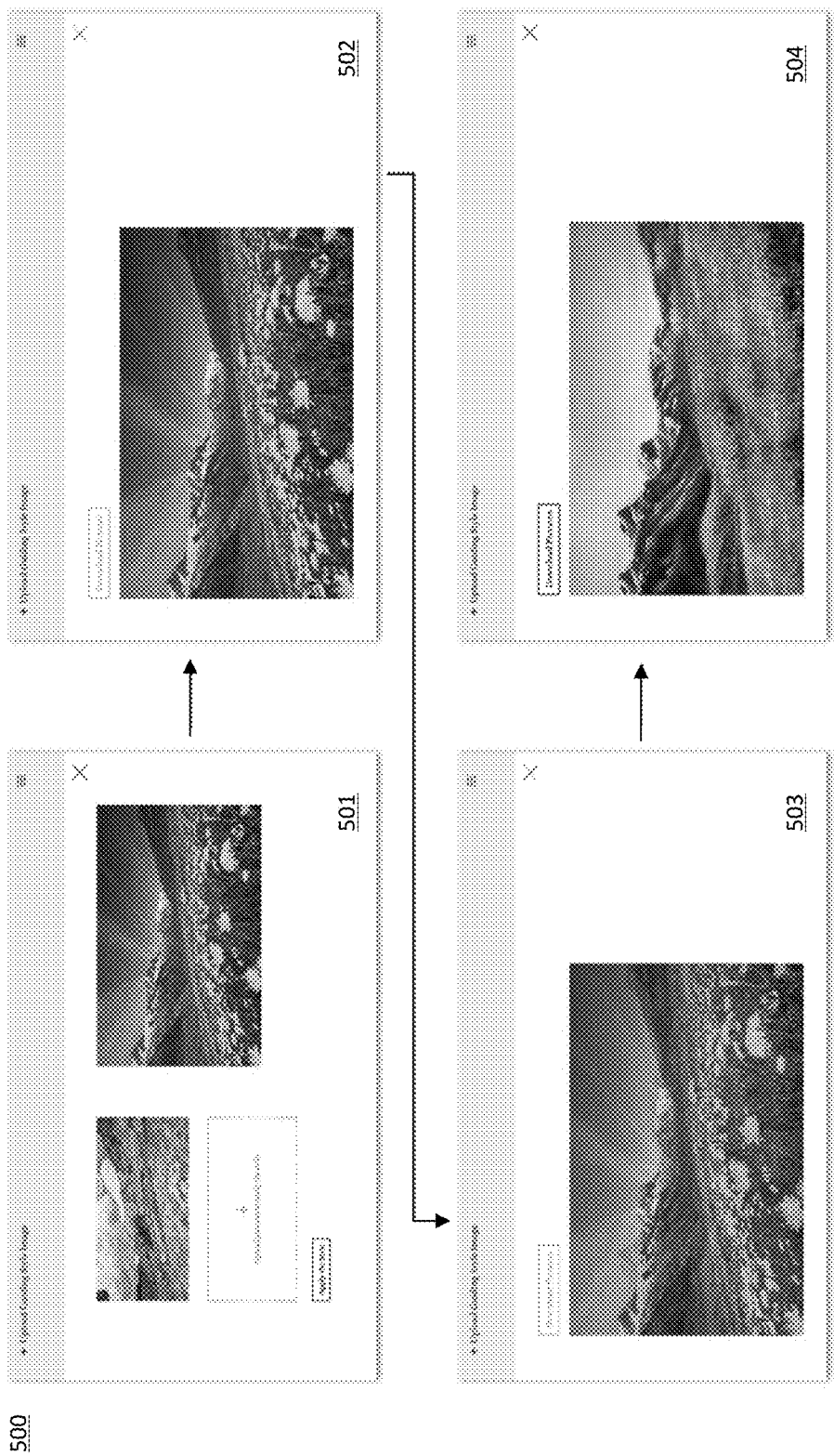
FIG. 5 illustrates front views of a GUI for a display screen or portion thereof wherein a content image is shown gradually transforming into a stylized output image.

FIG. 5 illustrates front views 500 of a GUI for a display screen or portion thereof wherein a content image (e.g., content image 322) is shown gradually transforming into a stylized output image (e.g., output image 326). In screen 501, a user can direct the system to begin the transformation. With each iteration shown in screens 502-504, the image is gradually transformed into the output image. In some cases, the image shown in each screen may correspond to the tentative output image 325 explained with respect to FIG. 3 above, that is, each image shown in screens 502-504 can be a progressively optimized output image under the professional processing model. In some examples, the user can pause the transformation at a desired optimization level, and save or download the image at that optimization level. The concepts illustrated in FIG. 5 can be combined with those shown in FIG. 4 such that multiple content images are selected, and the gradual transformation of each of the content images into a respective output image is shown simultaneously. If users are satisfied with the results, they may download the images individually or in groups. After viewing the results, users can choose to explore new pre-trained style, or upload new personalized guiding style image, or exit the interface.

Figure 6:
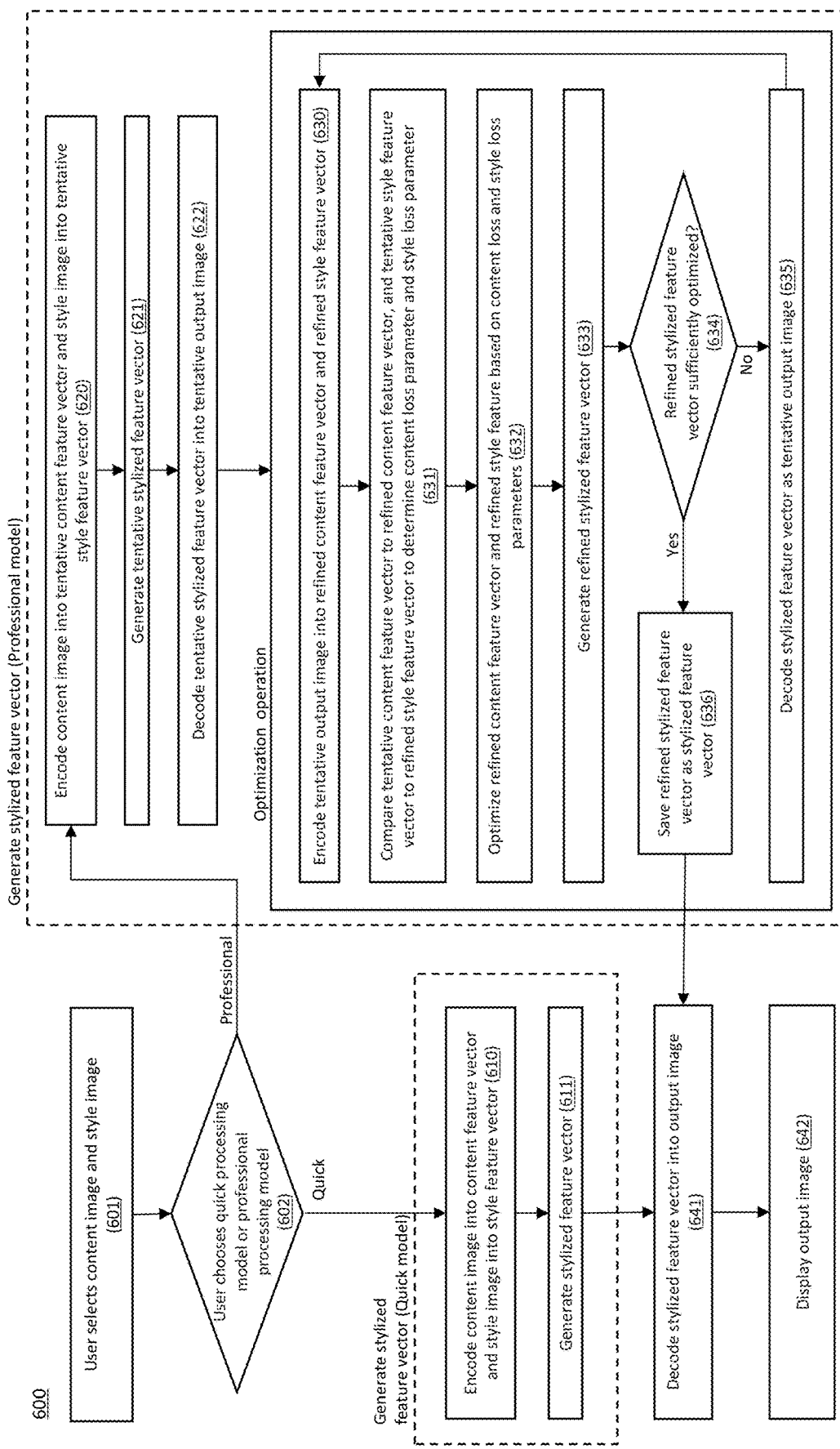
FIG. 6. illustrates a flow chart showing an exemplary method of generating stylized output images based on a user's desired content and style, according to embodiments of the invention.

FIG. 6 illustrates a flow chart 600 showing an exemplary method of generating stylized output images based on a user's desired content and style, according to embodiments of the invention. This method may correspond, for example, to the processes described with reference to FIGS. 1, 2, and 3 above.

At step 601, a content image representative of the user's desired content is selected by the user. At step 602, the user chooses either a quick processing model or a professional processing model.

The next step is to generate a stylized feature vector, and the method of doing so varies depending on whether the users chooses the quick processing model or the professional processing model at step 602. If the user chose the quick processing model, the next step is step 610, wherein the content image is encoded into a content feature vector and a style feature vector, and at step 611, the stylized feature vector is generated. For example, in step 611, the stylized feature vector may be generated using the whitening and coloring transformations described with reference to FIG. 2 above.

Alternatively, if the user selected the professional processing model at step 602, the stylized feature vector is generated as follows. At step 620, the content image is encoded into a tentative content feature vector and the style image is encoded into a tentative style feature vector. At step 621, a tentative style feature vector is generated. At step 622, the tentative stylized feature vector is decoded into a tentative output image. Next, the method enters an optimization operation encompassing steps 630-638. At step 630, the tentative output image is encoded into a refined content feature vector and refined style feature vector. At step 631, the tentative content feature vector is compared to the refined content feature vector, and the tentative style feature vector is compared to the refined style feature vector to determine a respective content loss parameter and style loss parameter. At step 632, the refined content feature vector and refined style feature vector are optimized based on the content loss and style loss parameters. At step 633, a refined stylized feature vector is generated based on the refined content feature vector and refined style feature vector. At step 634, a determination is made as to whether the refined stylized feature vector is sufficiently optimized. If it is not optimized, the stylized feature vector is decoded as a tentative output image, and the optimization operation repeats, as shown in step 635. However, if the refined stylized feature vector is optimized at step 634, then the stylized feature vector is saved as the stylized feature vector 636.

Once the stylized feature vector is generated (either by the quick processing model or the professional processing model), it is decoded into the output image, as shown in step 641. Finally, in step 642, the output image is displayed to the user.

Figure 7:
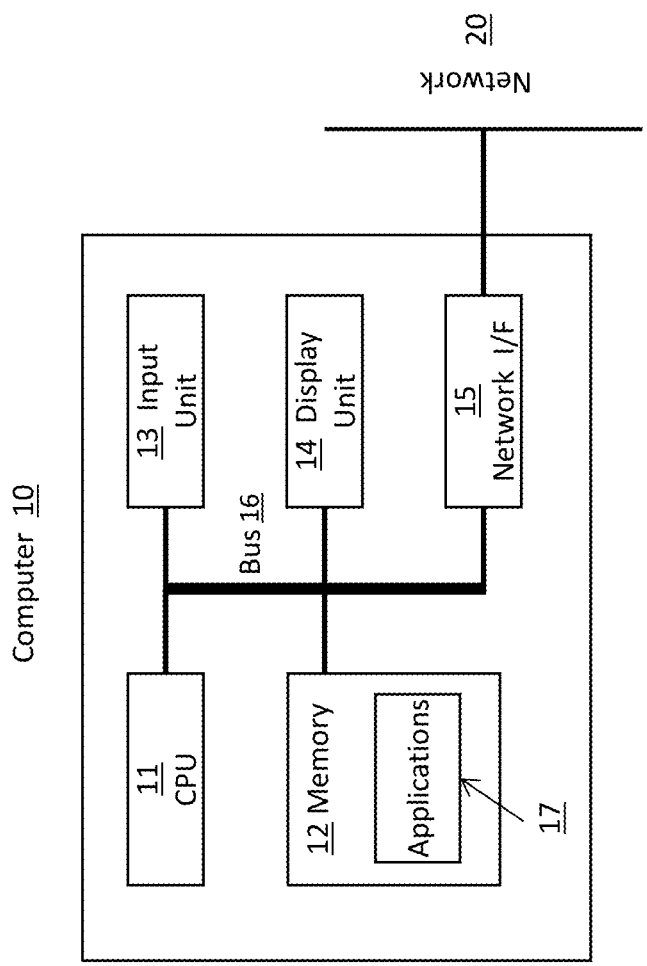
FIG. 7 illustrates a block diagram of an exemplary computer in which embodiments of the invention can be implemented.

FIG. 7 illustrates a block diagram of a computer 10 in which embodiments of the invention can be implemented. Computer 10 can perform any of the methods described with reference to FIGS. 1-4 above. Computer 10 can include one or more processors (CPU) 11, storage (memory) 12, an input unit 13, display unit 14, and network interface (I/F) 15 configured to interface with a network 20. These components may interface one with another via a bus 16. Applications 17 may be stored on memory 12 and may include data and instructions for performing any of the methods described in this disclosure, including those described with reference to FIG. 6. In some embodiments, computer 10 can be configured to work in conjunction with a back-end server, such as the back-end server 112 described with reference to FIG. 1.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should. be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A system for manipulating images according to user-chosen styles, comprising:
   a central processing unit (CPU);
   a memory;
   an interface device in communication with the memory and the CPU and configured to allow a user to:

upload one or more images to the memory, select a content image from the one or more images, select a style image from the one or more images, wherein the style image corresponds to a user's desired style comprising desired colors, textures, and patterns of a stylized output image; and set one or more process parameters stored in the memory, wherein the process parameters comprise an indication for the system to use a feed-forward model;

an encoder network comprising multiple neural computing layers configured to generate a content feature vector by extracting content features from the content image according to the process parameters by applying a series of non-linear transformations and generate a style feature vector by extracting style features from the style image according to the process parameters by applying a series of non-linear transformations;

the CPU configured to generate a stylized feature vector based on the content feature vector and the style feature vector; and the CPU configured to generate an output image based on the stylized feature vector;

wherein the interface is further configured to display the output image to the user, wherein the user utilizes an optimization image manipulation model that performs iterative optimization directly on pixel values of the output image to minimize both content loss and style loss, wherein the optimization image manipulation model minimizes an Euclidean distance between neural features of the content image and the output image, and minimizes the Euclidean distance between covariance matrixes of the neural features of the style image and the output image.

2. The system of claim 1, wherein:

the process parameters include an indication for the system to use an optimization-based model;

the decoder module is further configured to generate a tentative output image based on the stylized feature vector;

the encoder network is further configured to:

receive the tentative output image from the decoder, generate a tentative content feature vector by extracting content features from the tentative output image, generate a tentative style feature vector by extracting style features from the tentative output image;

the transformation module is further configured to:

generate a refined feature vector based on the content feature vector, tentative content feature vector, style feature vector, and tentative style feature vector; and the decoder module is further configured to:

generate a refined output image based on the refined feature vector, and until an optimization parameter is reached, repeatedly perform an optimization iteration by sending the refined output image as the tentative output image to the encoder network and receiving the resulting refined feature vector from the transformation module.

3. The system of claim 2, wherein the decoder module is further configured to repeatedly send the refined output image to the interface to be displayed with each optimization iteration.

4. The system of claim 3, wherein:

the optimization parameter is configured to be set by the user;

the interface is configured to, after displaying the refined output image, prompt the user for a choice whether to advance optimization or stop optimization, thereby setting the optimization parameter.

5. The system of claim 2, wherein the transformation model is further configured to:

compare the content feature vector to the tentative content feature vector to determine a content loss parameter;

compare the style feature vector to the tentative style feature vector to determine a style loss parameter; and generate the refined feature vector by adjusting the tentative content feature vector based on the content loss parameter and adjusting the tentative style feature vector based on the style loss parameter.

6. The system of claim 1, wherein:

the process parameters include an indication for the system to use a feed-forward model;

generating the content feature vector by extracting content features from the content image includes generating an initial content image vector and performing one or more whitening transformations on the initial content image vector; and generating the stylized feature vector by the transformation module includes performing a coloring transformation on the content feature vector.

7. The system of claim 6, wherein each of the neural computing layers of the encoder network is configured to perform one of the one or more whitening transformations, with each respective whitening transformation being performed at a different granularity level.

8. The system of claim 1, further comprising a distribution module configured to distribute operations of at least one of the encoder network, transformation module, or decoder module to an external processor.

9. The system of claim 1, wherein:

one of the process parameters set by the user includes a content amount parameter indicative of the user's desired amount of content features in the output image, and a style amount parameter indicative of the user's desired amount of style features in the output image; and the transformation module is configured to generate a stylized feature vector further based on content amount parameter and style amount parameter.

10. The system of claim 1, wherein the interface is configured to allow the user to select a plurality of content images from the one or more images, and the interface is configured to display a resulting plurality of output images corresponding to the plurality of content images.

11. A method of image manipulation based on a user's desired content and style, comprising:

obtaining, by a central processing unit (CPU), a content image representative of the user's desired content;

obtaining, by the CPU, a style image representative of the user's desired style, wherein the user's desired style comprises desired colors, textures, and patterns of a stylized output image;

obtaining, by the CPU, a choice of either a quick processing model or a professional processing model;

generating, by the CPU, a stylized feature vector, wherein the stylized feature vector is generated using the whitening and coloring transformations;

decoding, by the CPU, the stylized feature vector into an output image having the user's desired content and style; and displaying, by the CPU, the output image; wherein, upon choosing the quick processing model, generating, by the CPU, the stylized feature vector comprises:

encoding, by the CPU, the content image into a content feature vector by applying a series of non-linear transformations, wherein the content feature vector is generated by extracting content features from the content image by generating an initial content image vector and performing one or more whitening transformations on the initial content image vector;

encoding, by the CPU, the style image into a style feature vector by applying a series of non-linear transformations; and generating, by the CPU, the stylized feature vector based on the content feature vector and the style feature vector; and wherein, upon choosing the professional processing model, generating, by the CPU, the stylized feature vector comprises:

determining, by the CPU, an optimization parameter;

encoding, by the CPU, the content image into a tentative feature vector;

encoding, by the CPU, the style image into a tentative style feature vector, generating, by the CPU, a tentative stylized feature vector based on the tentative content feature vector and tentative style feature vector, applying, by the CPU, the tentative stylized feature vector to generate a tentative output image;

repeating, by the CPU, an optimization operation for a number of optimization iterations determined by the optimization parameter, the optimization operation comprising:

encoding, by the CPU, content elements of the tentative output image into a refined content feature vector, encoding, by the CPU, style elements of the tentative output image into a refined style feature vector, determining, by the CPU, a content loss parameter by comparing the tentative content feature vector to the refined content feature vector, determining, by the CPU, a style loss parameter by comparing the tentative style feature vector to the refined style feature vector, optimizing, by the CPU, the refined content feature vector and refined style feature vector based on the content loss parameter and style loss parameter, generating, by the CPU, a refined stylized feature vector based on the refined content feature vector and refined style feature vector, wherein in case the refined stylized feature vector is not sufficiently optimized according to the optimization parameter, decoding, by the CPU, the refined stylized feature vector into a refined output image, saving the refined output image as the tentative output image, and repeating the optimization operation, and wherein in case the refined stylized feature vector is sufficiently optimized according to the optimization parameter, saving, by the CPU, the refined stylized feature vector as the stylized feature vector, wherein the professional processing model performs iterative optimization directly on pixel values of the output image to minimize both content loss and style loss, wherein the professional processing model minimizes an Euclidean distance between neural features of the content image and the output image, and minimizes the Euclidean distance between covariance matrices of the neural features of the style image and the output image.

12. The method of claim 11 wherein, upon choosing the professional processing model, the optimization parameter is based on a desired level of optimization chosen by the user.

13. The method of claim 11 wherein, upon choosing the professional processing model, the optimization operation further comprises displaying the refined output image with each optimization iteration.

14. The method of claim 11 wherein, upon choosing the quick processing model, the content feature vector has a corresponding covariance matrix which is an identity matrix, and the stylized feature vector has the same covariance matrix.

15. The method of claim 11 wherein, upon choosing the quick processing model, encoding the content image into the content feature vector includes performing a feed-forward pass to remove style elements present in the content image.

16. The method of claim 15, wherein the feed-forward pass to remove style elements present in the content image includes performing a whitening transformation on the content feature vector, and generating the stylized feature vector based on the content feature vector and the style feature vector includes performing a coloring transformation on the content feature vector based on the style feature vector.

17. The method of claim 16, wherein the whitening transformation and coloring transformation are each performed a plurality of times on the content image at different levels of granularity.

18. The method of claim 11, further comprising:
obtaining a number of content images;
generating a plurality of stylized feature vectors including a respective stylized feature vector for each of the number of content images;
applying the plurality of respective stylized feature vectors to generate respective output images; and
displaying the output images, each output image having a respective display position and display size chosen based on the number of content images such that the output images are arranged in a grid.

19. The method of claim 11; wherein obtaining the style image includes the user uploading the style image.

20. A non-transitory computer-readable medium including instructions, which when executed by one or more processors, cause the processors to perform a method, comprising:
obtaining a content image representative of a user's desired content;
obtaining a style image representative of the user's desired style, wherein the user's desired style comprises desired colors, textures, and patterns of a stylized output image;
obtaining a choice of either a quick processing model or a professional processing model;
generating a stylized feature vector, wherein the stylized feature vector is generated using the whitening and coloring transformations;
applying the stylized feature vector to generate an output image having the user's desired content and style;
and displaying the output image; wherein, upon choosing the quick processing model, generating the stylized feature vector comprises:
encoding the content image into a content feature vector by applying a series of non-linear transformations, wherein the content feature vector is generated by extracting content features from the content image by generating an initial content image vector and performing one or more whitening transformations on the initial content image vector;
encoding the style image into a style feature vector by applying a series of non-linear transformations; and generating the stylized feature vector based on the content feature vector and the style feature vector; and wherein, upon choosing the professional processing model, generating the stylized feature vector comprises:

determining an optimization parameter;

encoding the content image into a tentative feature vector;

encoding the style image into a tentative style feature vector, generating a tentative stylized feature vector based on the tentative content feature vector and tentative style feature vector, applying the tentative stylized feature vector to generate a tentative output image;

repeating an optimization operation for a number of optimization iterations determined by the optimization parameter, the optimization operation comprising:

encoding content elements of the tentative output image into a refined content feature vector, encoding style elements of the tentative output image into a refined style feature vector, determining a content loss parameter by comparing the tentative content feature vector to the refined content feature vector, determining a style loss parameter by comparing the tentative style feature vector to the refined style feature vector, optimizing the refined content feature vector and refined style feature vector based on the content loss parameter and style loss parameter, generating a refined stylized feature vector based on the refined content feature vector and refined style feature vector, wherein in case the refined stylized feature vector is not sufficiently optimized according to the optimization parameter, applying the refined stylized feature vector to generate a refined output image, saving the refined output image as the tentative output image, and repeating the optimization operation, and wherein in case the refined stylized feature vector is sufficiently optimized according to the optimization parameter, saving the refined stylized feature vector as the stylized feature vector, wherein the professional processing model performs iterative optimization directly on pixel values of the output image to minimize both content loss and style loss, wherein the professional processing model minimizes an Euclidean distance between neural features of the content image and the output image, and minimizes the Euclidean distance between covariance matrixes of the neural features of the style image and the output image.

* * * * *